(12) United States Patent
Hu

(10) Patent No.: US 7,938,656 B2
(45) Date of Patent: May 10, 2011

(54) CARD CONNECTOR WITH SWITCH ELEMENT

(75) Inventor: Lan-Ping Hu, Shenzhen (CN)

(73) Assignee: Hon Hai Precision Ind. Co., Ltd., New Taipei (TW)

( * ) Notice: Subject to any disclaimer, the term of this patent is extended or adjusted under 35 U.S.C. 154(b) by 0 days.

(21) Appl. No.: 12/829,444

(22) Filed: Jul. 2, 2010

(65) Prior Publication Data

US 2011/0003496 A1 Jan. 6, 2011

(30) Foreign Application Priority Data

Jul. 2, 2009 (CN) .......................... 2009 20 305549

(51) Int. Cl.
*H01R 13/62* (2006.01)
(52) U.S. Cl. .................. 439/159; 439/188; 439/489
(58) Field of Classification Search .................. 439/159, 439/188, 630, 489; 200/51.1; 235/441
See application file for complete search history.

(56) References Cited

U.S. PATENT DOCUMENTS

| | | | |
|---|---|---|---|
| 5,778,521 A * | 7/1998 | Law et al. ................ 29/829 |
| 5,836,775 A * | 11/1998 | Hiyama et al. ........... 439/159 |
| 6,709,281 B2 | 3/2004 | Shishikura et al. |
| 7,261,578 B2 | 8/2007 | Zhao |
| 2010/0112839 A1 | 5/2010 | Sun |

* cited by examiner

*Primary Examiner* — Javaid Nasri
(74) *Attorney, Agent, or Firm* — Ming Chieh Chang; Wei Te Chung; Andrew C. Cheng

(57) ABSTRACT

A card connector (100) used for receiving a card (B) having a notch at a lateral edge thereof, comprises an insulative housing (10), a number of terminals (30) and two conductive pieces (40) retained in the insulative housing, and an ejector (50). The insulative housing defines a card receiving room for accommodating the card and a receiving cavity (109) communicating with the card receiving room. The ejector slides along the receiving cavity and comprises a slider (51) engaging with the card and moving along with the card. A conductive plate (80) is secured on the slider of the ejector. The conductive plate actively moves beneath the conductive pieces and slightly contacts the conductive pieces to establish an electrical connection between the conductive pieces through the conductive plate.

13 Claims, 10 Drawing Sheets

CARD CONNECTOR WITH SWITCH ELEMENT

BACKGROUND OF THE INVENTION

1. Field of the Invention

The present invention relates generally to a card connector, and more particularly to a card connector having a switch element for detecting a position of an inserted card.

2. Description of Related Arts

Integrated circuit (IC) cards are connected to other electronic devices electrically in conjunction with corresponding card connectors. In order to contact or cut electrically between IC cards and other equipments accurately and conveniently, the card connectors commonly equip with switches to achieve above-mentioned object.

U.S. Pat. No. 6,709,281 issued to Shishikura et al. on Mar. 23, 2004 discloses a card connector for receiving an electrical card. The card connector defines a card receiving space and comprises an insulating housing, a plurality of contacts exposed into the card receiving space and arranged on a bottom wall of the insulating housing, and a write protect switch. The write protect switch comprises a stationary metal piece and a cantilevered metal piece. The cantilevered metal piece has a projecting touching portion, which can come in contact with the electrical card. When the electrical card slides to one of two positions: a protect-on position (write inhibit position) and a protect-off position (write enable position), the two metal pieces is connected or separated structurally and electrically for detecting the electrical card.

In general, the write protect switch can detect a slide position of an electrical card. However, because the stationary metal piece meets the cantilevered metal piece which two simply contact with each other, dust and other matters residing on both of contacting portions thereof can not be cleared automatically, resulting in no-reliable connection between the two metal pieces of the switch. Accordingly, the electrical card is not effectively detected.

Hence, an improved card connector is highly desired to overcome the aforementioned disadvantage of the prior art.

SUMMARY OF THE INVENTION

Accordingly, an object of the present invention is to provide a card connector having a switch element which effectively detects a position of an inserted card.

To achieve the above object, A card connector used for receiving a card having a notch at a lateral edge thereof, comprises an insulative housing, a number of terminals and two conductive pieces retained in the insulative housing, and an ejector. The insulative housing defines a card receiving room for accommodating the card and a receiving cavity communicating with the card receiving room. The ejector slides along the receiving cavity and comprises a slider engaging with the card and moving along with the card. A conductive plate is secured on the slider of the ejector. The conductive plate actively moves beneath the conductive pieces and slightly contacts the conductive pieces to establish an electrical connection between the conductive pieces through the conductive plate.

Other objects, advantages and novel features of the invention will become more apparent from the following detailed description when taken in conjunction with the accompanying drawings.

DETAILED DESCRIPTION OF THE PREFERRED EMBODIMENT

Figure 1:
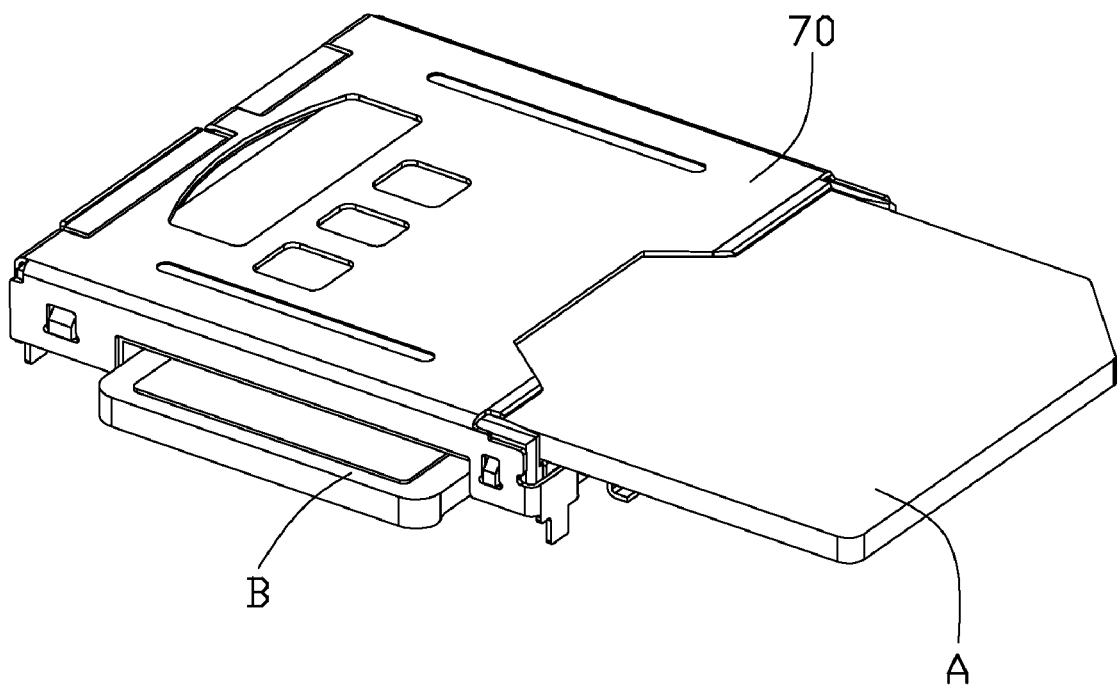
FIG. 1 is a perspective, assembled view of a card connector constructed in accordance with the present invention, with two cards respectively as A and B inserted therein.
Figure 2:
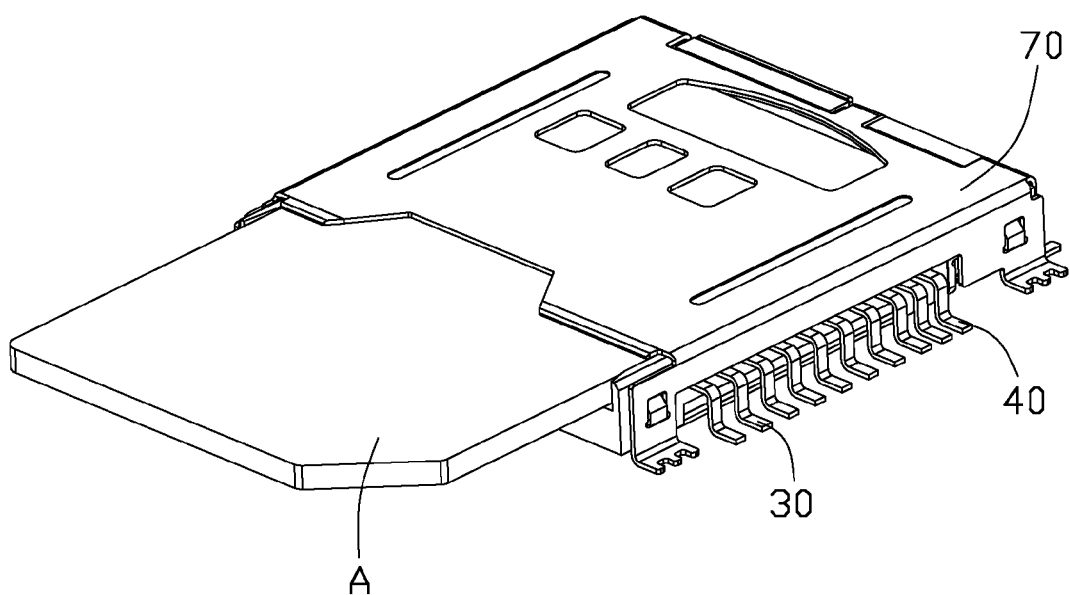
FIG. 2 is another perspective, assembled view of the card connector of FIG. 1.
Figure 3:
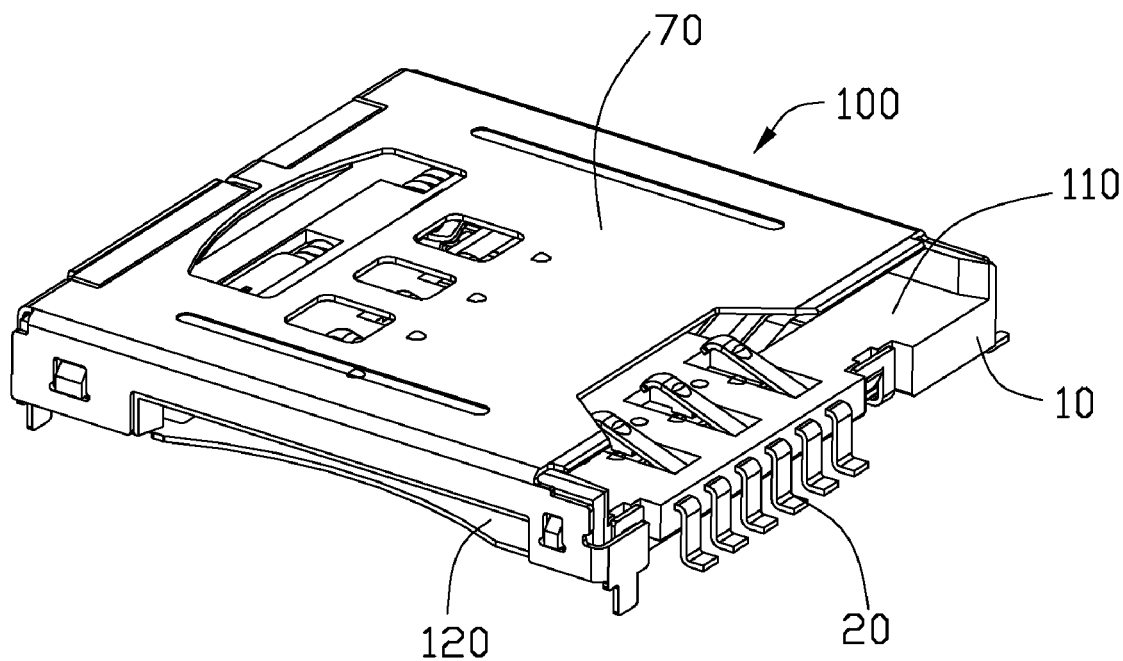
FIG. 3 is a perspective, assembled view of the card connector without the two cards.
Figure 4:
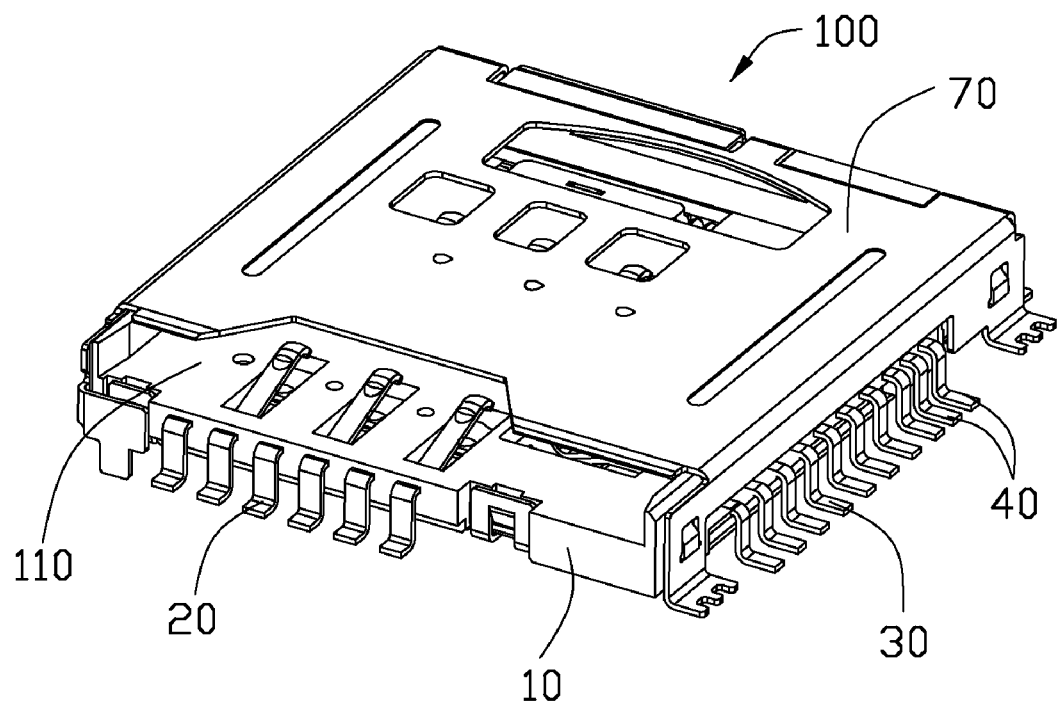
FIG. 4 is another perspective, assembled view of the card connector without the two cards.

Reference will now be made in detail to the preferred embodiment of the present invention.

Referring to FIGS. 1-10, a card connector 100 of the present invention is used for receiving two cards respectively as a first card A and a second card B. The first card A is preferably a SIM (Subscriber Identity Module) card and the second card B is preferably a SD (Secure Digital Memory) card in this embodiment. The SD card B defines a notch (not shown) at a lateral edge thereof. The card connector 100 includes an insulative housing 10, a plurality of first terminals 20 and a plurality of second terminals 30 received in the insulative housing 10, a pair of conductive pieces 40, an ejector 50 assembled at a side of the insulative housing 10, a bottom shell 60 and a top shell 70 covering the insulative housing 10 for defining two card receiving rooms 110, 120. A first card receiving room 110 is defined between the top shell 70 and the insulative housing 10 for receiving the first card A and a second card receiving room 120 is defined between the bottom shell 60 and the insulative housing 10 for receiving the second card B. The card connector 100 further comprises a conductive plate 80, which is secured with the ejector 50. The conductive plate 80 connects or disconnects with the conductive pieces 40 when the second card B is inserted at different positions, such that the conductive pieces 40 and the conductive plate 80 are used as a switch (not labeled) for detecting the insertion of the card B. The card connector 100 further comprises a card lock 90, which is also secured with the ejector 50.

Figure 5:
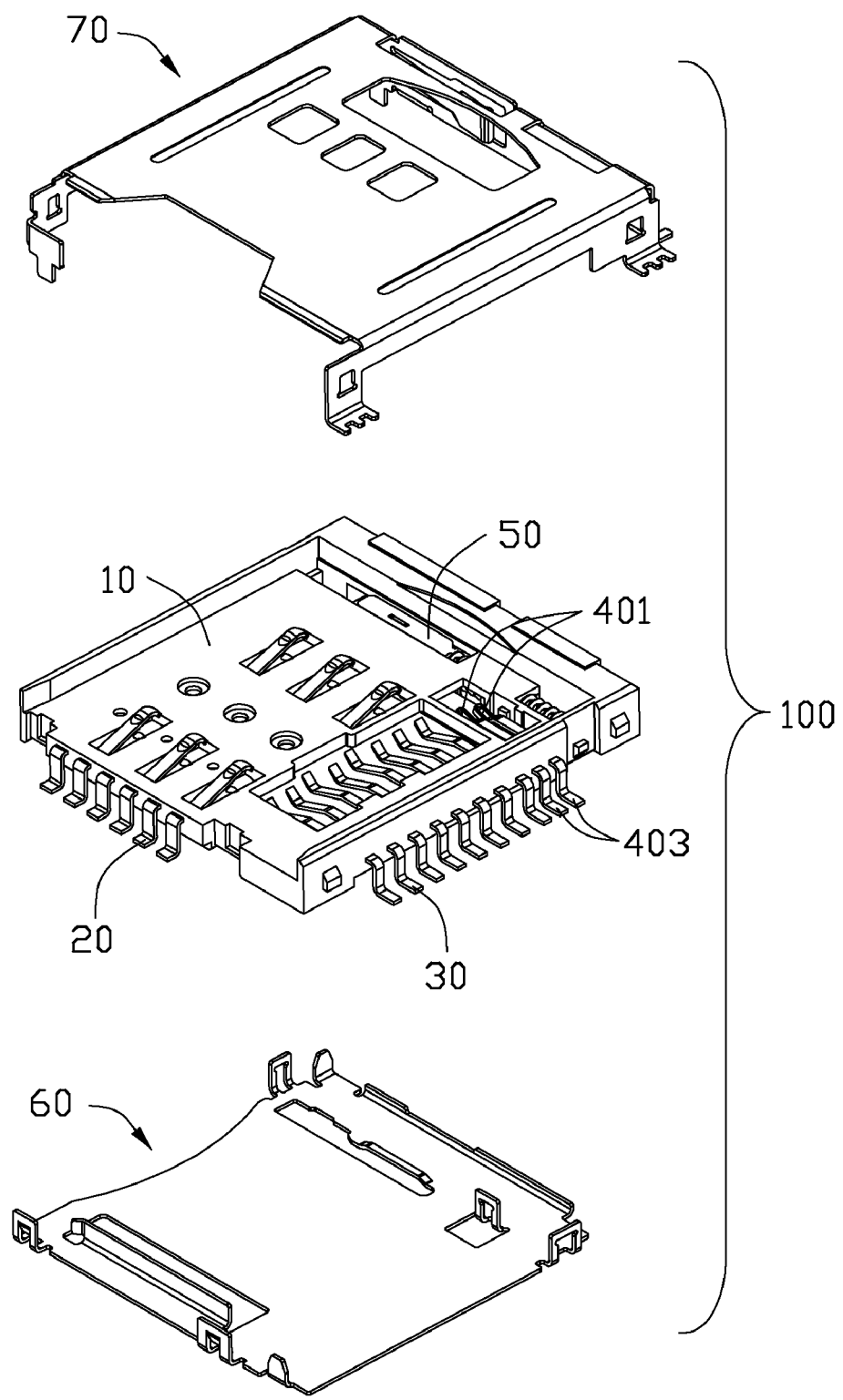
FIG. 5 is a perspective, partly assembled view of the card connector.
Figure 6:
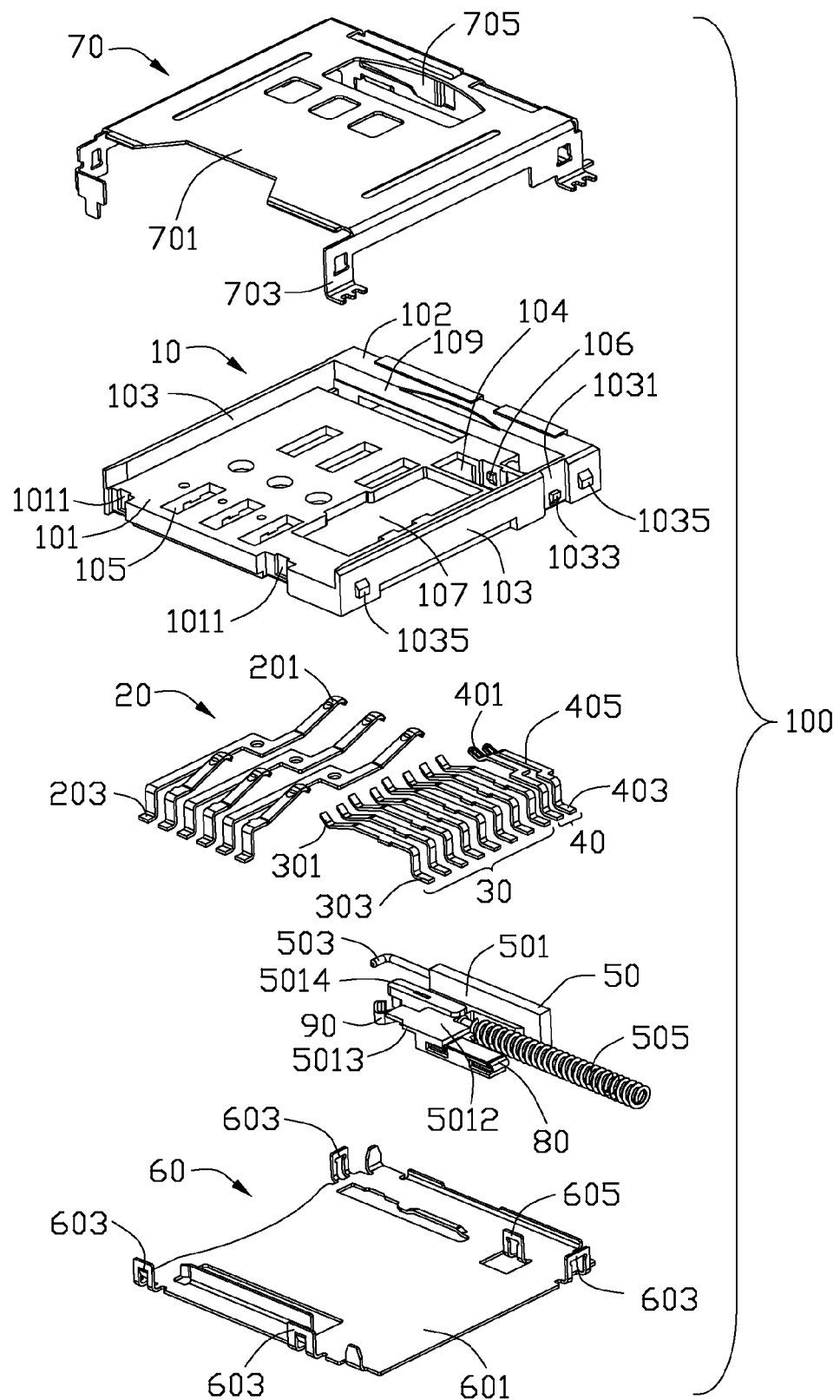
FIG. 6 is a perspective, exploded view of the card connector.

Referring to FIGS. 5 and 6, the insulative housing 10 is rectangular and comprises a base portion 101, a rear wall 102, and a pair of lateral walls 103 extending upwardly, vertically from the base portion 101. The base portion 101 defines an upper surface (not labeled) which the rear wall 102 and the lateral walls 103 extend from and a lower surface (not labeled) opposite to the upper surface. The base portion 101 defines a plurality of passageways 105 extending through the upper and the lower surfaces thereof. The passageways 105 are arranged in two rows along a front-to-rear direction taken along with the insertion of the first card A. The passageways 105 are used for retaining the first terminals 20. The base portion 101 defines a cutout 107 abutting against the passageways 105, which is used for receiving the second terminals 30 and the second terminals 30 are retained in the cutout 107 along a left-and-right direction perpendicular to the front-to-rear direction. The insulative housing 10 defines a receiving cavity 109, which is located adjacent to the rear wall 102 and extends along the left-and-right direction. The receiving cavity 109 is used for receiving parts of the ejector 50. The receiving cavity 109 communicates with the second card receiving room 120.

Referring to FIGS. 5 and 6, the base portion 101 of the insulative housing 10 defines a pair of recessed portions 1011 for assembling the bottom shell 60. The lateral walls 103 defines a plurality of first protrusions 1035 for both assembling the top and the bottom shells 70, 60. The lateral walls 103 further define a pair of recesses 1031 at distal ends of the receiving cavity 109. Each lateral wall 103 forms a second protrusion 1033 received in the corresponding recess 1031. The base portion 101 further defines a slot 104 between the cutout 107 and the receiving cavity 109. The cutout 107 extends through the upper surface and the lower surface of the base portion 101. The base portion 101 forms a third protrusion 106 extending into the slot 104.

Figure 7:
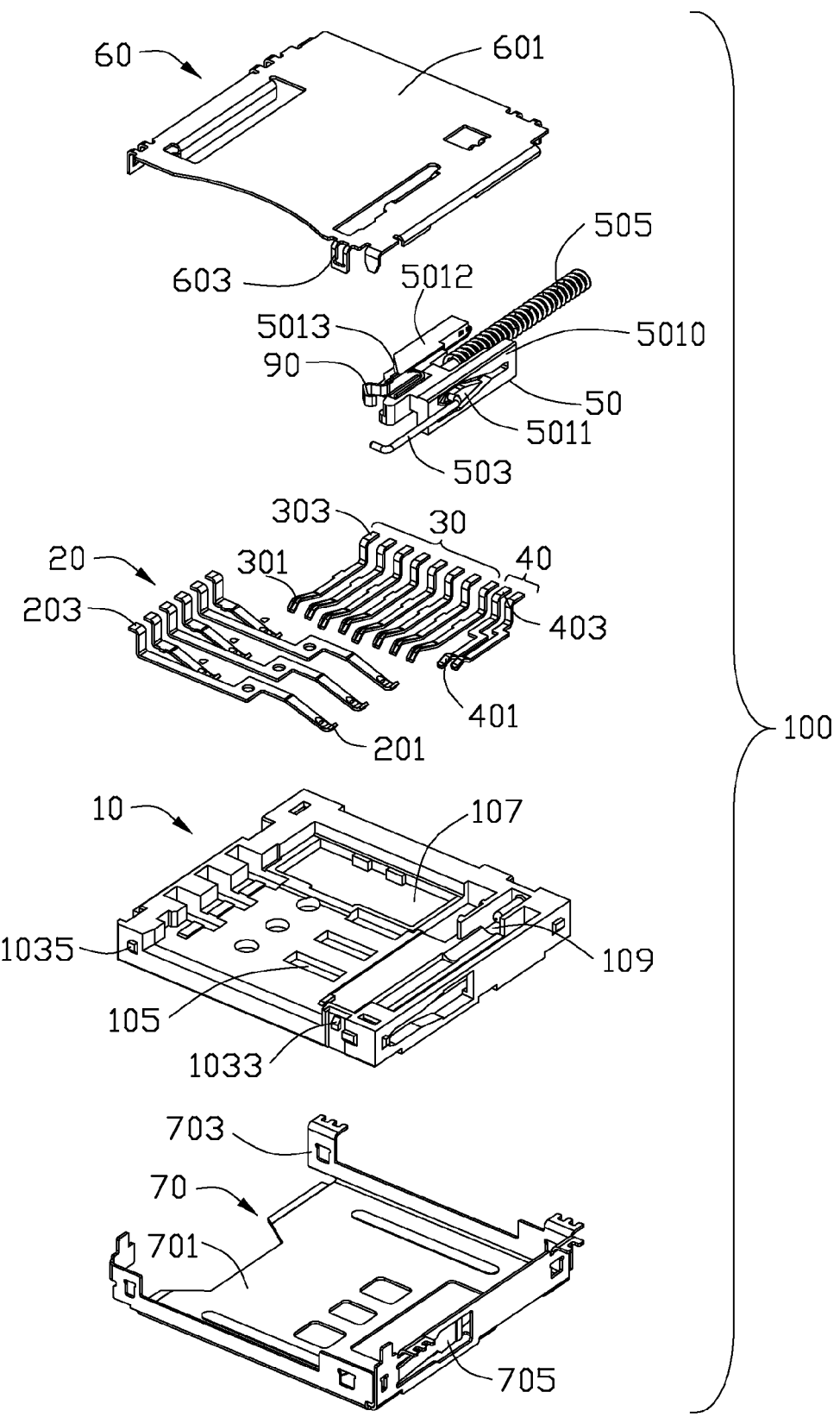
FIG. 7 is another perspective, exploded view of the card connector.

Referring to FIGS. 5-7, the first terminals 20 are received in the passageways 105 of the insulative housing 10 along the front-to-rear direction. The second terminals 30 are received in the cutout 107 along the left-and-right direction. The first and second terminals 20, 30 form a plurality of soldering pads 203, 303 which are electrically connected to a printed circuit board and a plurality of contacting pads 201, 301 respectively extending into the first and the second card receiving rooms 110, 120. The arrangement of the first terminals 20 is complied with the standard of SIM card connector, and the arrangement of the second terminals 30 is also complied with the standard of SD card connector, and both are not described in detail herein.

Referring to FIGS. 5 and 6, the conductive pieces 40 are received in the slot 104 of the insulative housing 10. Each conductive piece 40 comprises a scraping/contacting portion 401 received in the slot 104 and partially extending beyond the lower surface of the base portion 101, a meandering/connecting portion 405 extending from the scraping/contacting portion 401, and a tail/soldering portion 403 extending from the meandering/connecting portion 405 to align with the soldering pads 303 of the second terminals 30.

Referring to FIGS. 5-8, the ejector 50 is used for ejecting the SD card B out of the second card receiving room 120. The ejector 50 comprises a slider 501, a pin member 503, and a spring member 505. The slider 501 comprises a first block portion 5010 locating at a side of the spring member 505 and a second block portion 5012 locating at an opposite side of the spring member 505. The first block portion 5010 defines a heart-shaped slot 5011 and is attached to an outer surface of the rear wall 102 of the insulative housing 10. The second block portion 5012 extends beside the second card receiving room 120 and secures the conductive plate 80 and the card lock 90 at opposite ends thereof. The second block portion 5012 forms a slantwise surface 5013 facing towards the second card receiving room 120. The second block portion 5012 defines a plurality of slits 5014. The spring member 505 of the ejector 50 is received in the receiving cavity 109 and is compressed by the slider 501 when the SD card B is inserted. The pin member 503 has two bending ends, with one bending end securing to the insulative housing 10 and the other bending end slidably moving in the heart-shaped slot 5011.

Referring to FIGS. 6 and 7, the top shell 70 and the bottom shell 60 comprise respective main portions 701, 601 and a plurality of retention portions 703, 603 extending vertically from the main portions 701, 601. The retention portion 703, 603 are correspondingly assembled with the recessed portion 1011, the second protrusions 1033 of the recesses 1031, and the first protrusions 1035. Particularly, the bottom shell 60 further comprises a stamped portion 605 at the main portion 301. The stamped portion 605 is received the slot 104 and is engaged with the third protrusion 106. The top shell 70 further comprises an elastic piece 705 pressing against the pin member 503 of the ejector 50 when the card connector 100 is assembled.

Figure 8:
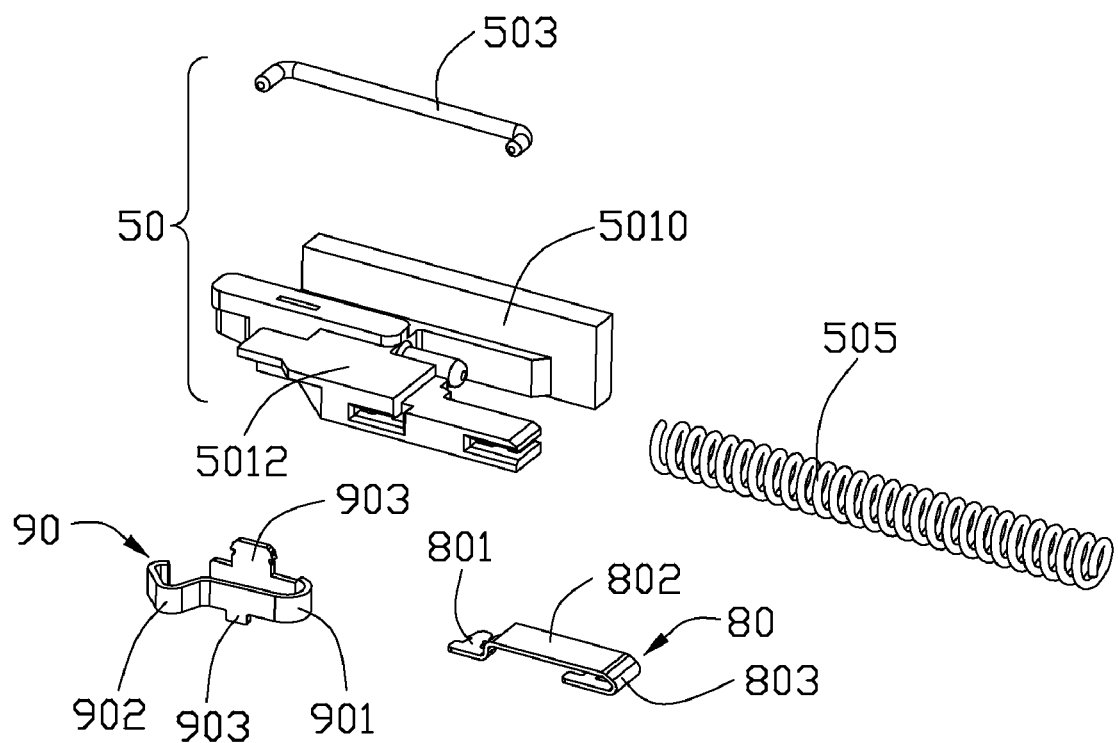
FIG. 8 is a perspective, exploded view of the ejector.
Figure 9:
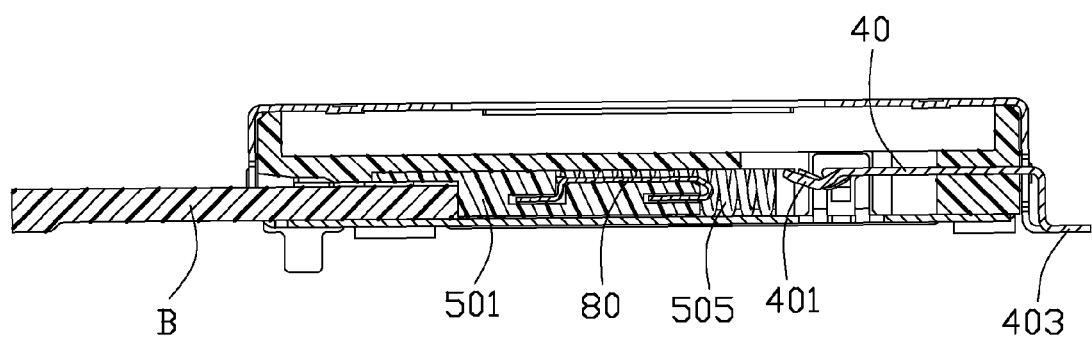
FIG. 9 is a first cross-sectional view of the electrical connector when the card B is not fully inserted.
Figure 10:
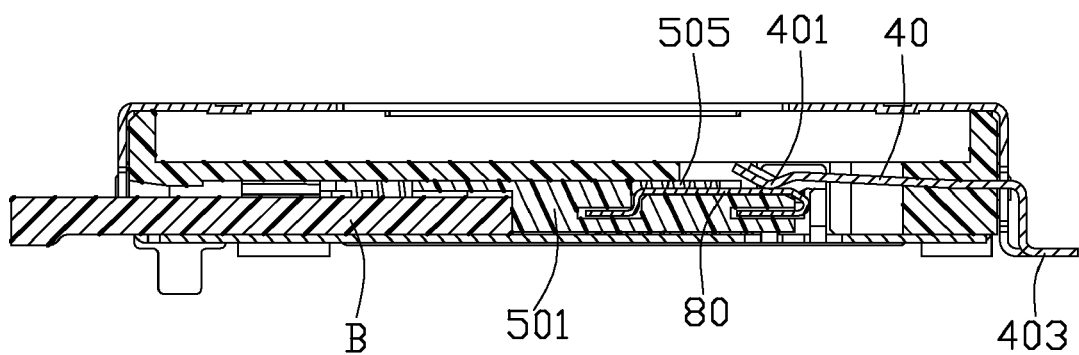
FIG. 10 is a second cross-sectional view of the electrical connector when the card B is fully inserted.

Referring to FIGS. 6 and 8, the conductive plate 80 is metallic and comprises a retaining wing 801 at one end thereof, a hook portion 803 at the other end thereof, and a flat piece 802 connecting with the retaining wing 801 and the hook portion 803. The retaining wing 801 and the hook portion 803 are both engaged with the second block portion 5012 of the slider 501. The card lock 90 is also metallic and comprises a U-shaped portion 901 and a V-shaped locking portion 502 integral with the U-shaped portion 901. The U-shaped portion 901 comprises a pair of retaining pins 903 respectively receiving in the slits 5014 of the slider 501.

Referring to FIGS. 1-10, the SIM card A and the SD card B are respectively inserted into the card connector 100. The SIM card A is received in the first card receiving room 110 throughout a first card inserting port (not labeled) and electrically connects with the first terminals 20. The SD card B is received in the second card receiving room 120 throughout a second card inserting port (not labeled) and electrically connects with the second terminals 30. The first card receiving room 110 is stacked above the second card receiving room 120. When the SD card is at a first position at which the switch is at a protect-on position (write inhibit position) as shown in FIG. 5, the spring member 505 is in a released state and the conductive plate 80 and the conductive pieces 40 are disconnected. When a user pushes the SD card B, the locking portion 502 of the card lock 90 snaps with the notch of the SD card B. The slantwise surface 5013 of the slider 501 abuts against the lateral edge of the SD card B and so, the slider 501 moves together with the SD card B. The pin member 503 slides in the heart-shaped slot 5011 and the spring member 505 is compressed, during which, the conductive plate 80 moves to the conductive pieces 40, and ultimately, the conductive plate 80 is located beneath the conductive pieces 40. Because the conductive pieces 40 are raised upward such that the connection between the conductive pieces 40 and the conductive plate 80 is very stable. The switch is at the protect-off position (write enable position) as shown in FIG. 6, and the SD card B is inserted at a second position. When the SD card B is ejected to the original first position from the second position, the slantwise surface 5013 of the slider 501 pushes the SD card B out of the card connector 100 and the switch renews to the protect-on position (write inhibit position).

In the present invention, because the conductive plate 80 moves along with the slider 501 in the insertion/ejection of the SD card B, the flat piece 802 of the conductive plate 80 connects or disconnects with the scraping/contacting portions 401 of the two conductive pieces 40 of the switch, it is possible to clean dust and other matters residing on both of scraping/contacting portions 401 of the conductive pieces 40 automatically. Reliable connection is achieved between the two metal pieces of the switch. Accordingly, whether the SD card B is fully inserted or not is durably and effectively detected. Because the conductive pieces 40 are raised upward and accordingly, resilience of the conductive pieces 40 is still strong, nearly not weakened after repeated use.

While a preferred embodiment in accordance with the present invention has been shown and described, equivalent modifications and changes known to persons skilled in the art according to the spirit of the present invention are considered within the scope of the present invention as described in the appended claims.

What is claimed is:

1. A card connector, used for receiving a card having a notch at a lateral edge thereof, comprising:
   an insulative housing defining a card receiving room for accommodating the card and a receiving cavity communicating with the card receiving room;
   a plurality of terminals retained in the insulative housing;
   an ejector sliding along the receiving cavity and comprising a slider engaging with the card and moving along with the card;
   two conductive pieces retained in the insulative housing beside the terminals; and
   a conductive plate being moveable with the slider of the ejector, the conductive plate comprising a flat piece, a retaining wing at one end of the flat piece, and a hook portion at an opposite end of the flat piece, the retaining wing and the hook portion lying substantially on a first horizontal plane, the flat piece substantially lying on a second horizontal plane, both the retaining wing and the hook portion being secured to the slider; wherein
   the conductive plate is moveable beneath the conductive pieces to bring the flat piece to contact the conductive pieces to establish an electrical connection between the conductive pieces through the conductive plate.

2. The card connector as described in claim 1, wherein the slider comprises a first block portion defining a heart-shaped slot and a second block portion located beside the card receiving room, and the ejector comprises a spring member located between the first and the second block portions.

3. The card connector as described in claim 2, wherein the spring member is received in the receiving cavity.

4. The card connector as described in claim 3, wherein the first block portion is assembled on an outer surface of the insulative housing.

5. The card connector as described in claim 3, further comprising a card lock secured at one end of the second block portion, the card lock having a locking portion protruding into the notch of the card, and wherein the conductive plate is assembled at an opposite end of the second block portion relative to the card lock.

6. The card connector as described in claim 5, wherein the slider defines a slantwise surface abutting against the lateral edge of the card.

7. A card connector, used for receiving two cards, comprising:
   an insulative housing the insulative housing comprising a base portion, the base portion defining a receiving cavity, a slot, a plurality of passageways, and a cutout;
   a plurality of first terminals and a plurality of second terminals retained in the passageways and the cutout correspondingly along transverse directions for connecting with a first card and a second card respectively;
   a top shell and a bottom shell both attached to the insulative housing and cooperating with the insulative housing respectively to define a first card receiving room and a second card receiving room for the two cards, wherein the first card receiving room is stacked above the second card receiving room;
   an ejector sliding along the receiving cavity for acting on the second card inserted in the second card receiving room, the ejector comprising a plastic slider;
   two conductive pieces retained in the slot; and
   a conductive plate being moveable with the slider of the ejector for detecting insertion of the second card, the conductive plate comprising a flat piece, a retaining wing at one end of the flat piece, and a hook portion at an opposite end of the flat piece, the retaining wing and the hook portion lying substantially on a first horizontal plane, the flat piece substantially lying on a second horizontal plane, both the retaining wing and the hook portion being secured to the slider; wherein
   the slot is arranged between the cutout and the receiving cavity.

8. The card connector as claimed in claim 7, wherein the conductive pieces have contacting portions extending out of the slot and towards the bottom shell.

9. The card connector as claimed in claim 8, wherein the conductive plate moves beneath the conductive pieces and the conductive pieces are raised up into the slot completely.

10. The card connector as claimed in claim 8, wherein the first and the second terminals extend beyond opposite surfaces of the base portion into associated card receiving rooms.

11. A card connector for receiving a card having a notch at a lateral edge thereof, comprising:
    an insulative housing defining a card receiving room for accommodating the card and a receiving cavity communicating with the card receiving room;
    a plurality of terminals retained in the insulative housing;
    an ejector sliding along the receiving cavity and comprising a slider for engaging with the card and moving along with the card;
    at least a switch contact set disposed beside the ejector;
    a metallic conductive plate secured on the slider of the ejector at a first positions for activating the switch contact set during movement of the slider; and
    a metallic card lock secured on the slider of the ejector at a second position closer to an insertion opening of the card receiving room than the first position for locking into the notch of the card when the slider is moved to an inner position; wherein
    said slider having said conductive plate and said card lock secured thereon, performs as one piece and moves together along a common direction; wherein
    said ejector defines integrally a blocking portion for engagement with the card without any linked operation portion exposed to an exterior, and is moveable along with the card in a same direction either during insertion of the card or withdrawal of the card.

12. The card connector as claimed in claim 11, wherein said conductive plate is assembled to the slider along a first direction while the card lock is assembled to the slider along a second direction perpendicular to said first direction.

13. The card connector as claimed in claim 12, wherein said first direction is a horizontal direction while the second direction is a vertical direction.

* * * * *